Aug. 5, 1958

J. S. CULVER ET AL 2,845,716

ALIGNING JIG

Filed March 3, 1945

INVENTOR.
William C. Tunnell
Joseph S. Culver
BY

Robert A. Lavender

Aug. 5, 1958                J. S. CULVER ET AL                2,845,716
                                ALIGNING JIG

Filed March 3, 1945                                    2 Sheets-Sheet 2

INVENTOR.
William C. Tunnell
Joseph S. Culver
BY

Robert A. Lavender

United States Patent Office 2,845,716
Patented Aug. 5, 1958

2,845,716

ALIGNING JIG

Joseph S. Culver and William C. Tunnell, Oak Ridge, Tenn., assignors, by mesne assignments, to the United States of America as represented by the United States Atomic Energy Commission Application March 3, 1945, Serial No. 580,787

5 Claims. (Cl. 33—180)

This invention relates to a jig or device for setting or aligning an opening in one member relative to another member or structure. The jig may be used to set an opening in one member with a predetermined offset relative to another structure or another member with an opening or it may be used for measuring the amount of offset with which the parts have previously been set. The invention is particularly adapted for setting a member having an opening in the form of a slit relative to another member or structure, and even more particularly it is adapted for setting a member having a slit therein relative to another member or structure having a parallel slit.

The jig of this invention finds particular application in apparatus as mentioned above wherein it is desired to set a member having a slit therein relative to another structure or member having a parallel slit. A type of apparatus in which this structure is found, and in which our invention finds great adaptability is the isotope separating apparatus disclosed in the earlier applications of Ernest O. Lawrence Ser. No. 557,784 filed October 9, 1944, which matured into Patent No. 2,709,222 on May 24, 1955, and of Emmet V. Martin Ser. No. 561,271 filed October 31, 1944 which matured into Patent No. 2,712,073, on June 28, 1955. The isotope separating or segregating equipment disclosed in these patents embodies an ion source which involves a chamber having a slit in its upper portion through which vaporized material passes, and it then passes upwardly through two other members or structures each having a slit in them parallel to the first slit through which the vapor passes. In this type of apparatus it is necessary that the two upper slit structures be precisely adjusted relative to the first slit, and with a predetermined offset relative to the first slit. The spacing of the slit, that is its width, and the parallelism of the three slits must also be accurate. While as mentioned above, our invention finds particular adaptability in making adjustments and measuring offsets in the type of apparatus just described, it is not limited to such uses, and can be used in many other arrangements where it is desired to set or adjust one member relative to another.

An object of our invention is to provide a jig or adjusting device for accurately setting or adjusting a member having an opening relative to another member or structure.

Another object of the invention is to provide a jig or device for setting a member having a slit relative to another structure having a parallel slit with a predetermined offset and in exact parallelism, or for measuring the amount of offset of the member having a slit relative to the structure having a slit.

Another object of our invention is to provide a jig or device for adjusting a member having an opening relative to another structure, the device comprising spreading means for internally engaging the opening and means attachable to or engageable with the structure which the opening is to be set relatively to, and the spreading means being mounted or carried by a member which is movable relative to the part of the device which attaches to or engages with the said structure.

Another object of our invention is to provide a jig or adjusting device for adjusting an opening in one member relative to an opening in another member, the device comprising two relatively movable parts one of which engages or attaches to one of the members having an opening and the other of which carries an expansible or spreader structure which engages within the opening in the other member so that when the expansible structure is expanded, the two parts of the device will move relatively until the expansible structure engages the opening in the first member internally on opposite sides, the amount of relative movement of the two parts then being an indication of the offset of the opening in one member relative to the other.

Another object of the invention is to provide a jig or device for setting a member having a slit relative to another structure having a parallel slit, the device comprising two relatively movable parts, one of which engages or attaches to the structure having a slit, and the other of which carries expansible or spreadable feeler members which are manually expansible so as to engage the slit in the first member so that upon expansion of the spreader members, the one part of the device will move relative to the other part until the opening in the first member is internally engaged on opposite sides by the spreader members, the position of the one part of the device relative to the other then being a measure of the offset of the slit member relative to the structure having a parallel slit.

Further objects of our invention and numerous of its advantages will become apparent from the following detailed description and annexed drawing wherein Fig. 1 is a plan view of the jig or device of our invention.

Figure 1:
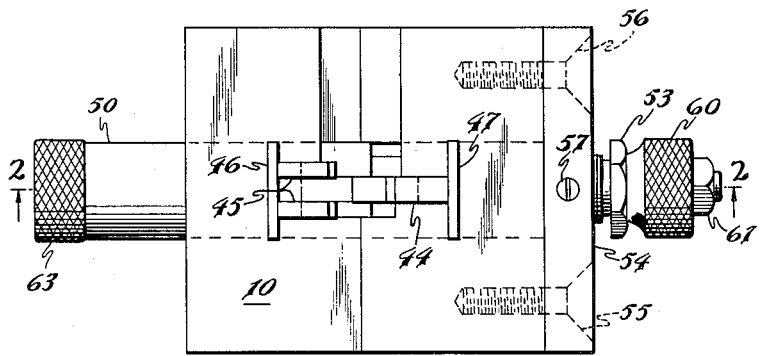

Referring to the drawings, the device of our invention comprises two sliding block members 10 and 12 (see Fig. 4) which are rabbetted together to permit sliding movement of one relative to the other without lateral disalignment. The block 12 has a set of graduations inscribed thereon as shown at 13, and the graduations are opposite a zero index or indicia scribed on block 10. The graduations are for the purpose of reading the amount of relative movement of block member 10 relative to block member 12 and they constitute calibrations for the amount of offset of one member relative to another which is measured by the jig and as will become more apparent below. The blocks 10 and 12 are of built-up construction so as to form mutually engaging shoulders which constitute the rabbetted joint. The block 10 is formed in two halves as shown which are held together by a panel 14 with shoulders on opposite sides attached to its lower side, and this panel engages in an undercut channel, groove, or way in the block 12 so as to form the rabbetted joint (see Fig. 3). The panel 14 has oppositely extending shoulders as described and as may be seen on Fig. 2, and it is attached to the halves of block 10 by counter sunk screws as shown at 18 and 19 on Fig. 3. The laminated or built-up portion of block 12 includes plates as indicated at 20 and 21 on Fig. 3, these plates being attached to the main or body portion of block 12 by screws 22 and 23. The plates are attached along the sides of the block member 12, and the plates 21 extend inwardly beyond the plates 20 so that an undercut groove is formed as described above.

and the panel 14 of block 10 slidably fits into this groove or channel so that the block members can be slid relative to one another without binding or misalignment.

Figure 2:
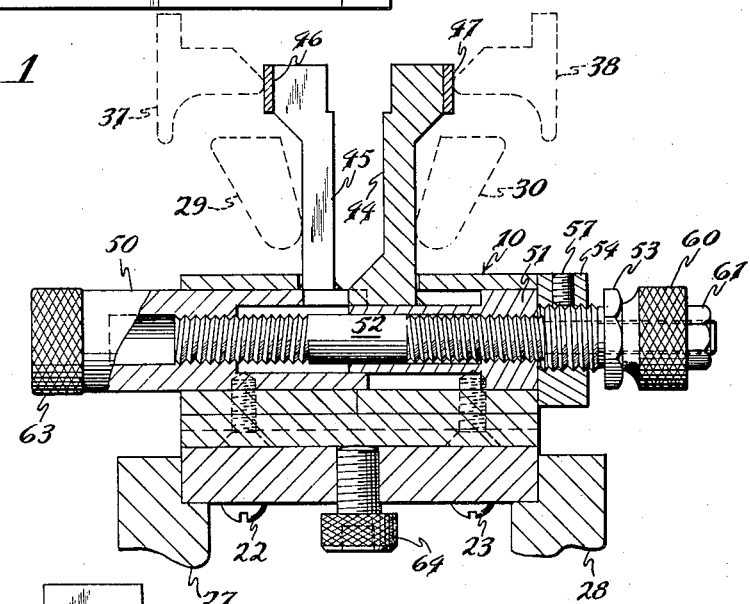
Fig. 2 is a cross sectional view of the jig in position relative to the slit structure, this view being taken along the line 2—2 of Fig. 1.
Figure 3:
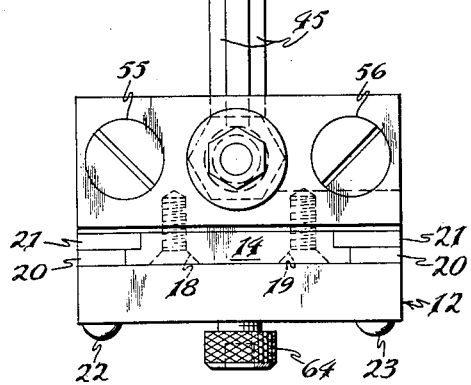
Fig. 3 is an end view of the jig.
Figure 4:
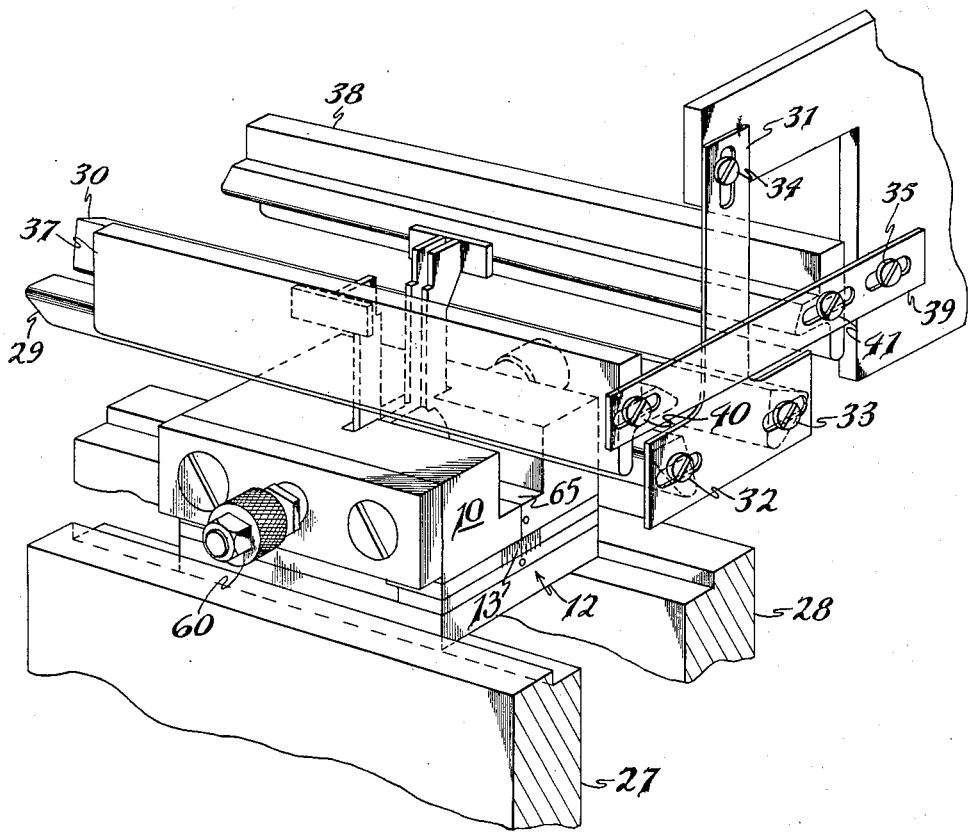
Fig. 4 is a perspective view of the jig in position relative to structure having slits which are to be adjusted relatively or to have their offset measured.

In Figs. 2 and 4 the jig is shown fitting into or engaging with members 27 and 28 which are spaced apart and which form between them a slit structure such as referred to above in connection with the earlier applications mentioned. Members 27 and 28 have shoulders cut in them as shown and the edges of the block member 12 accurately fit in or engage with the shoulders. The entire jig can be slid along in the shoulders in members 27 and 28. Above the structure comprised by members 27 and 28 are parallel members 29 and 30 which form a slit between them and which have a cross sectional shape as shown on Fig. 2. Members 29 and 30 are above the main portion of the jig. They are adjustably supported by means of a bracket 31 (see Fig. 4). The bracket 31 may be adjusted by means of the attaching screw 34 extending through a slot as shown and each of the members 29 and 30 may be individually adjusted relative to the bracket 31 by means of the attaching screws 32 and 33 which extend through slots in the bracket 31. Above the members 29 and 30 is another pair of parallel members 37 and 38 having a cross sectional shape as shown on Fig. 2. These members also form a slit-like opening between them, and they are supported at their ends by a bracket 39. Bracket 39 can be adjusted itself by means of the attaching screws 35 extending through a slit as shown, and the members 37 and 38 can be individually adjusted by means of the adjustable attaching screws 40 and 41 which extend through slots in the bracket 39.

The purpose of the jig as exemplified by its use herein is to measure the offset of the slit members 29 and 30 or 37 and 38 relative to the slit formed between members 27 and 28 or to set or adjust these members relative to the members 27 and 28.

The block 10 has upstanding therefrom a pair of fingers or feeler members 44 and 45 which constitute expansible or spreader means for engaging the slit members 29, 30, 37, and 38 as shown on Figs. 2 and 4. The finger or feeler members 44 and 45 carry feeler pads 46 and 47 respectively, and these members may move toward and away from each other and the feelers telescope when they move toward each other, the feeler member 45 being of double construction as may be seen on Figs. 3 and 4 so that the feeler member 44 can fit within the member 45. The feeler member 45 is supported by, or carried from, a sleeve or spindle member 50, rotatably fitting in the block 10, the member 45 extending upwardly through an opening of slit-like formation in the upper part of block 10 as may be seen on Fig. 4. The feeler member 44 is supported or carried by another sleeve or spindle member 51 rotatably mounted in the block 10, the feeler member 44 extending upwardly through part of the opening through which member 44 extends. The inner end of spindle or bushing 50 has a bore as shown and a screw threaded counter bore, and the inner end of spindle or bushing 51 is of smaller diameter so as to fit in or journal in the bore in inner end of spindle 50 as shown. The spindle 51 also has a screw threaded bore and engaging therewith and also engaging the screw threaded counter bore of spindle 50 is a screw threaded stem 52, the screw threads of which at the different ends are of opposite hand. The right end of stem 52 extends through a nipple nut 53 having a screw threaded nipple which engages with a plate 54 attached to the block 10 by screws 55 and 56 and carries a set screw 57 which bears against the nipple portion of nut 53 and by which the nipple nut can be secured against rotation. Fastened on the end of stem 52 is a knurled knob 60 by means of a nut 61. The stem 52 can be rotated by the knurled knob, the stem rotating freely within the nipple nut 53. When the stem 52 is rotated, since its screw threaded portions are of opposite hand, the spindles 50 and 51 moves in opposite directions and, of course, the feeler members 44 and 45 move correspondingly the openings which the feeler members extend through restraining the spindles from rotation. That is, by turning the knurled knob 60 the feeler members 44 and 45 can be brought together, and telescoped or they can be expanded, that is spread apart so that they engage the slit members on their opposite sides. The spindle 50 has a knurled knob, 63 at its left end, and by turning this knob when the members 44 and 45 are telescoped, these members can be turned down into a groove or channel 65 cut in the block member 10. As will appear below the feeler members 44 and 45 are turned down into this channel when the jig is first set in the members 27 and 28 for use.

Numeral 64 is another knurled knob on the the end of a screw extending through the block 12, and the end bearing against the block 10, that is against the panel 14, the purpose of this knob and screw being to securely set the two blocks relative to each other. That is, they can be set for a predetermined offset as measured by the graduations 13 and the slit members then adjusted accordingly and set as will be described below.

When the set screw 57 is loosened, the nipple nut 53 can be turned in the plate 54, and this is for adjusting the stem 52 and the spindles and feeler members in either direction simultaneously. In other words, the entire feeler member and spindle and stem assembly can be adjusted as a whole by adjusting the nipple nut 53, and the purpose of this is to center the feeler member assembly relative to the zero index on the block 10. When nipple nut 53 is adjusted the feeler member assembly is slid to right or left. After the feeler member assembly has been centered the nipple nut 53 can be set by turning down on the set screw 57.

When the jig is to be used, the feeler members or fingers 44 and 45 are telescoped in the manner described and turned down into the channel 65. The jig is then put in position between the members 27 and 28 as shown, and the feeler members 44 and 45 are then re-erected by turning the knob 63 until they are in a vertical position between the slit members as shown on Figs. 2 and 4. If now it is desired to measure the offset of the slit members 37 and 38, for example, relative to the slit formed by the members 27 and 28, the knob 60 is turned in a direction to cause the members 44 and 45 to spread apart. Knob 64 will be turned to the released position to permit relative motion of blocks 10 and 12. If the slit between members 37 and 38 is offset relative to the slit between the members 27 and 28 (this being the offset which is being measured) one of the feeler pads 46 or 47 will engage its associated slit member before the other. Thus, if feeler pad 46 meets resistance first by engaging member 37, further movement of feeler member 45 will be prevented, and continued rotation of the knob 60 will cause the block member 10 to move relatively to block member 12 and in the opposite direction (opposite to the direction feeler member 45 moved) until feeler pad 47 engages its associated slit member, that is the member 38. When this happens, the slit formed by members 37 and 38 will be internally engaged on opposite sides by the feeler pads 46 and 47, continued rotation of knob 60 will be prevented and the reading on the graduated scale 13 of block 12 will be the amount of offset of the slit between members 37 and 38 relative to the slit between members 27 and 28. The offset can now be checked throughout the length of the slit members, that is the parallelism can be checked by sliding the jig as a whole lengthwise in the shoulders in the members 27 and 28.

The offset of the slit formed between members 29 and 30 is measured in the same way, these members being engaged by the lower portion of feeler members 44 and 45.

If it is desired to set the slit, for example, the slit between members 37 and 38 with a predetermined offset relative to the slit between members 27 and 28, the amount of the desired offset is set on the graduated scale 13 and the knurled knob 64 is then turned up tightly to prevent relative motion between the blocks 10 and 12. The jig is put in position as before in the shoulders in the member 27 and 28, and the support bracket 39 for the members 37 and 38 is loosened to permit movement of the slit members. The feeler members 44 and 45 are expanded as before until they engage the slit members 37 and 38. When setting the slit members in this manner for or with a predetermined offset, when the feeler member 44 and 45 have been fully expanded, that is, when their respective feeler pads both engage the members 37 and 38, the slit members 37 and 38 will have been moved to the position of predetermined offset as previously set at 13. By then sliding the jig along in the members 27 and 28 parallelism throughout the length of the slit members can be checked and set. The slit members may be supported by brackets at both ends if desired.

From the foregoing, those skilled in the art will observe that we have provided a jig or a device whereby a member having an opening can be set or adjusted relative to another opening or structure with a predetermined accurately measured offset. Since the feeler members engage the slit internally on opposite sides, the setting or the measurement is precisely determined by the point at which the knob 60 can no longer be turned. Accuracy throughout the length of the slit members can be checked simply by sliding the jig along the length of the slit structure.

It is to be understood that all matters contained in the above description and examples are illustrative only and do not limit the scope of this invention, as it is intended to claim the invention as broadly as possible in view of the prior art.

We claim:

1. A device for measuring the offset of a member having an opening relative to another structure comprising means forming two relatively adjustable sliding blocks, one of said blocks being adapted to engage with said structure, the other of said blocks carrying expansible means, means for expanding the expansible means so as to internally engage the opposite sides of the opening in said member, the arrangement being such that upon said expansible means engaging only one side of said opening continued expansion thereof causes the other of said blocks to move relative to said one block until said opening is engaged internally on opposite sides, the amount that said one block has been moved relative to the other block then being a measure of the offset of said opening relative to said structure.

2. A device for setting a member having a slit therein relative to another structure having a parallel slit, with a predetermined offset of one slit relative to the other, comprising means forming two relative adjustable sliding blocks, one of said blocks being adapted to interlockingly engage with said structure, the other of said blocks carrying expansible means, means including a rotatable bushing for expanding the expansible means so as to internally engage the slit in said member, means for setting and locking said other block relative to said one block so that the expansible means are spaced from a reference point by the amount of the desired offset, the reference point being fixed relative to said structure, said expansible means being operable when expanding to move said member until the opening therein is internally engaged on opposite sides, the slit therein then being in the position of the desired predetermined offset, and said device being movable longitudinally of said slit so as to check the parallelism and offset.

3. A device for measuring the offset of a member having a slit therein relative to another structure having a parallel slit comprising means forming two relatively adjustable sliding blocks, one of said blocks being adapted to interlockingly engage with said structure and being rabbeted to receive the other of said blocks, the other of said blocks carrying expansible means, means for actuating the expansible means for expanding it to internally engage the slit in said member, the arrangement being such that upon said expansible means engaging only one side of said slit continued expansion causes the other of said blocks to move relatively to said one block until the slit in said one member is engaged internally on opposite sides, the amount said one block having been moved relative to the other block then being a measure of the offset of said slit member relative to said structure, and said device being movable longitudinally of said slits.

4. In an adjusting and setting device, in combination, means forming two relatively adjustable sliding blocks, means comprising members adapted to be adjusted toward and away from each other carried by one of said blocks, means for operating said members comprising a rotatable stem having screw threads of opposite hand so arranged that upon rotation thereof said members move either toward or away from each other, the arrangement being such that upon rotation of said stem, if one of said members has its movement resisted, said one block is caused to move relative to said other block until the motion of the other member is also resisted, and means for locking said two blocks together so that upon rotation of said stem one or the other of said members may engage with structure and cause said structure to be moved until both of said members engage with said structure so that continued movement is prevented, the amount of movement of the structure being determined by the relative positions in which the said two blocks are locked together.

5. In an adjusting and setting device, in combination, means forming two relatively adjustable blocks, means comprising members adapted to be adjusted toward and away from each other carried by one of said blocks, means for operating said members comprising a rotatable stem having screw threads of opposite hand so arranged that upon rotation thereof said members move either toward or away from each other, the arrangement being such that upon rotation of said stem, if one of said members has its movement resisted, said one block is caused to move relative to said other block until the motion of the other member is also resisted, and means for locking said two blocks together so that upon rotation of said stem or the other of said members may engage with structure and cause said structure to be moved until both of said members engage with said structure so that continued movement is prevented, the amount of movement of the structure being determined by the relative positions in which the said two blocks are locked together, mounting means for the said members and operating stem and means forming a base engaging with said mounting means in slidable relationship whereby upon one of said members meeting resistance during its motion said mounting means may be caused to move relative to said base.

References Cited in the file of this patent

UNITED STATES PATENTS

| | | |
|---|---|---|
| 109,423 | King | Nov. 22, 1870 |
| 282,765 | Peer | Aug. 7, 1883 |
| 376,838 | Whitney | Jan. 24, 1888 |
| 1,102,449 | Stensland | July 7, 1914 |
| 1,402,497 | Hoffman | Jan. 3, 1922 |
| 1,404,190 | Buckminister | Jan. 24, 1922 |
| 1,422,746 | Couse | July 11, 1922 |
| 2,156,500 | Jeschor | May 2, 1939 |
| 2,379,406 | Alvis | July 3, 1945 |

UNITED STATES PATENT OFFICE
CERTIFICATE OF CORRECTION

Patent No. 2,845,716                                                August 5, 1958

Joseph S. Culver et al.

It is hereby certified that error appears in the printed specification of the above numbered patent requiring correction and that the said Letters Patent should read as corrected below.

Column 6, line 48, claim 5, after "stem" insert -- one --.

Signed and sealed this 4th day of November 1958.

(SEAL)
Attest:

KARL H. AXLINE                                                 ROBERT C. WATSON
Attesting Officer                                              Commissioner of Patents